(12) United States Patent
Takemoto

(10) Patent No.: US 6,377,027 B2
(45) Date of Patent: Apr. 23, 2002

(54) DISCHARGE CIRCUIT AND DUTY RATIO SETTING METHOD

(75) Inventor: Tsuyoshi Takemoto, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/781,135

(22) Filed: Feb. 12, 2001

(30) Foreign Application Priority Data

Feb. 14, 2000 (JP) ......................................... 2000-034636

(51) Int. Cl.⁷ .............................. H02J 7/00; H02M 1/10
(52) U.S. Cl. ........................................ 320/135; 363/142
(58) Field of Search ................................. 320/135, 136, 320/139; 307/66; 363/142

(56) References Cited

U.S. PATENT DOCUMENTS 6,127,801 A  * 10/2000  Manor ......................... 320/112

* cited by examiner

*Primary Examiner*—Gregory Toatley
(74) *Attorney, Agent, or Firm*—Sughrue Mion, PLLC

(57) ABSTRACT

A battery controller 6 is connected to a DC/DC converter 3. The battery controller 6 checks the capacities of a battery 4 and a battery 5, calculates a duty ratio between the battery 4 and the battery 5 based on the capacities to determine a switching timing in which a plurality of switching elements are to be switched, and sets the duty ratio in the DC/DC converter 3.

7 Claims, 4 Drawing Sheets

PERIOD A  PERIOD B  PERIOD C  PERIOD D

DISCHARGE CIRCUIT AND DUTY RATIO SETTING METHOD

FIELD OF THE INVENTION

The present invention relates to a discharge circuit and a duty ratio setting method.

BACKGROUND OF THE INVENTION

Conventionally, a multiple-battery power supply method used for a data processing apparatus (or unit) supplies power simultaneously from a plurality of batteries with the same characteristics.

Referring to FIG. 4, a discharge circuit using the conventional Power supply method will be described.

The conventional discharge circuits shown in FIG. 4 comprises a battery 4 and a battery 5, which have the same characteristics, and a data processing apparatus 8 which comprises a DC/DC converter 3, a switching element 9 connected to the DC/DC converter 3, and a unit load 7.

Turning on the switching element of the conventional discharge circuit with the configuration described above causes the battery 4 and the battery 5 to discharge simultaneously, this configuration can decrease the discharge rate of each battery and increase battery efficiency.

SUMMARY OF THE DISCLOSURE

However, various problems have been encountered in the art in the course of investigations toward the present invention. That is, if a plurality of batteries, each with its own characteristics, is connected to the conventional discharge circuit described above, the battery with the highest voltage discharges first. Therefore, the discharge ratio between the battery 4 and the battery 5 depends on the voltage characteristics. That is, the battery 4 or the battery 5, whichever is higher in voltage, discharges first. As a result, the problem with the conventional circuit is that the battery with the highest voltage loses its capacity first and, after that, the battery with the lowest voltage is subjected to discharge alone.

Therefore, the conventional discharge circuit does not make the best use of simultaneous discharging, and during discharging, the remaining battery capacity varies among batteries.

The present invention seeks to solve the problems associated with the prior art described above. It is an object of the present invention to provide a discharge circuit and a control method of discharging that allow a plurality of batteries a simultaneous discharging regardless of their battery voltages. Other objects of the present invention will become apparent from the entire disclosure.

According to a first aspect of the present invention, there is provided a discharge circuit comprising at least two batteries, a plurality of switching elements connected to the batteries, and a DC/DC (Direct Current/Direct Current) converter controlling ON/OFF states of the plurality of switching elements, wherein a duty ratio setting unit is connected to the DC/DC converter, the duty ratio setting unit checking capacities of the batteries, calculating a duty ratio based on a battery capacity ratio calculated from the capacities of the batteries to determine a switching timing in which the plurality of switching elements are to be switched, and setting the duty ratio in the DC/DC converter.

The discharge circuit with this configuration sets the duty ratio in the DC/DC converter based on the battery capacity ratio calculated from the capacities of the batteries. Therefore, the batteries are simultaneously discharged regardless of their voltages, and the plurality of batteries may be used up at the same time.

According to a second aspect of the present invention, there is provided a discharge circuit, wherein the duty ratio setting unit checks remaining capacities of the batteries, calculates a new duty ratio based on the battery capacity ratio calculated from the remaining capacities, and updates the duty ratio set in the DC/DC converter.

In accordance with the second aspect, the duty ratio may be changed based on the capacity ratio. Therefore, it is assured that the batteries are simultaneously discharged regardless of their voltages, and the plurality of batteries may be used up at the same time.

According to a third aspect of the present invention, there is provide a duty ratio setting method comprising the steps of: detecting capacities of at least two batteries; calculating a battery capacity ratio from the battery capacities followed by calculating, based on the battery capacity ratio, a duty ratio which determines a switching timing in which a plurality of switching elements connected to the batteries are to be switched; and transmitting the duty ratio to a DC/DC converter as a signal to set the duty ratio in the DC/DC converter.

In accordance with the duty ratio setting method comprising those steps, the duty ratio based on the battery capacity ratio calculated from the capacities of the batteries may be set (and updated) in the DC/DC converter. Therefore, the batteries may be simultaneously discharged regardless of their voltages, and the plurality of batteries may be used up at the same time.

According to fourth aspect of the present invention, the duty ratio setting method further comprises the steps of: checking remaining capacities of the batteries when the battery capacity ratio varies caused by discharge of the batteries; calculating a remaining capacity ratio between the batteries based on the remaining capacities of the batteries to calculate a new duty ratio from the remaining capacity ratio of the batteries; and transmitting the calculated new duty ratio to the DC/DC converter as a signal to change the duty ratio that is set in the DC/DC converter.

In accordance with the duty ratio setting method of the fourth aspect, the new duty ratio based on the remaining capacity ratio calculated from the capacities of the batteries is set in the DC/DC converter to change (update) the old duty ratio. Therefore, the batteries may be simultaneously discharged regardless of their voltages, and the plurality of batteries may be used up at the same time.

According to a fifth aspect, there is provided a computer readable program product which sets a duty ratio, the program causing a processor to check capacities of at least two batteries; calculate a duty ratio which determines a switching timing in which a plurality of switching elements connected to the batteries are to be switched; and send the duty ratio to a DC/DC converter as a signal to set the duty ratio in the DC/DC converter.

The duty ratio setting program comprising those steps sets the duty ratio, which is based on the capacity ratio of the batteries calculated from the capacities of the batteries, in the DC/DC converter. Therefore, the batteries may be simultaneously discharged regardless of their voltages, and the plurality of batteries may be used up at the same time.

The program product is carried by a medium, typically a recording medium, which, however, includes a static/nonstatic or dynamic medium, also including a carrier wave carrying the program via transmission lines or networks."

PREFERRED EMBODIMENTS OF THE INVENTION

A simultaneous discharge circuit and a simultaneous battery discharge method according to an embodiment of the present invention will be described with reference to the attached drawings.

Figure 1:
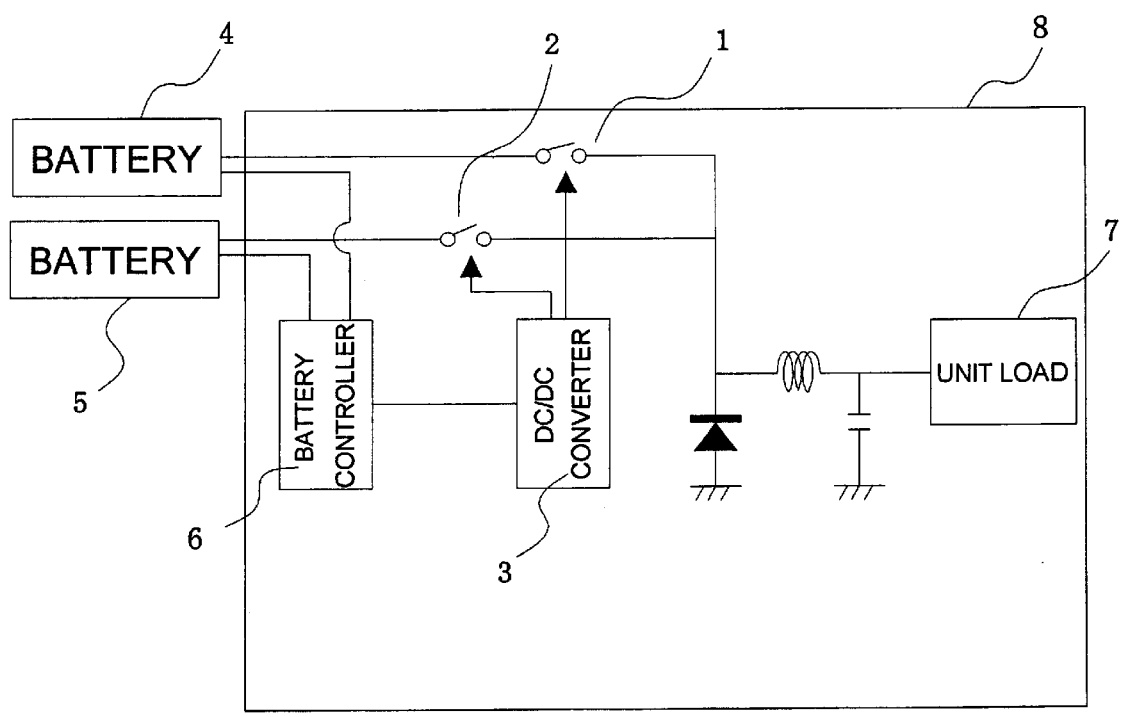
FIG. 1 is a diagram showing the configuration of a first embodiment of a discharge circuit according to the present invention.

FIG. 1 is a diagram showing the configuration of a discharge circuit used in a first embodiment of the present invention.

The discharge circuit used in the fist embodiment of the present invention has a data processing apparatus 8 comprising a DC/DC converter 3 controlling a switching element 1 and a switching element 2 to convert the DC voltage, a battery controller 6 connected to the DC/DC converter 3 and to a battery 4 and a battery 5, and a unit load 7. The battery 4 and the battery 5 supply power to the data processing apparatus 8. The battery 4 is connected to the switching element 1 and the battery 5 to the switching element 2.

The duties of the switching element 1 the switching element 2, which control the ON/OFF state of those switching elements, are set in the DC/DC converter 3. The duty is defined as a ratio between the period of time during which a switching element is on and the period of time during which the switching element is off.

In addition, a duty ratio that determines a timing in which the switching element 1 and the switching element 2 are switched is also set in the DC/DC converter 3. In other words, the duty ratio is a ratio between a duty of the switching element 1 connected to the battery 4 and a duty of the switching element 2 connected to the battery 5.

The battery controller 6 checks (i. e., periodically detects) the capacities of the battery 4 and the battery 5 and, based on the ratio between the capacity of the battery 4 and that of the battery 5, calculates the duty ratio ensuring an optimum discharge of the battery 4 and the battery 5. The optimum discharge refers to the discharge of the battery 4 and the battery 5 such that both batteries will be exhausted at the same time.

The calculated duty ratio is input to the DC/DC converter 3 as a duty ratio control signal. The duty ratio entered as the duty ratio control signal is used to set the duty ratio in the DC/DC converter 3.

The duty ratio control signal may be input as an analog signal or a digital signal.

Next, the operation of the battery simultaneous discharge circuit and the battery simultaneous discharge method in the first embodiment of the present invention will be described with reference to FIGS. 1 and 2.

Figure 2:
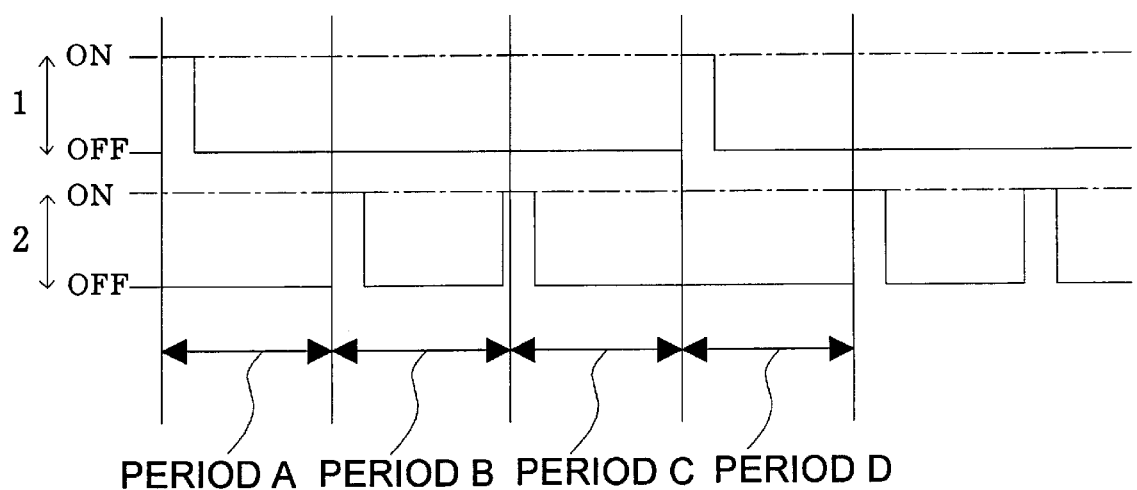
FIG. 2 is a diagram showing a timing in which a DC/DC converter in the first embodiment of the present invention controls switching operation.

FIG. 2 is a diagram showing the control timing of the switching element 1 and the switching element 2, which are controlled by the DC/DC converter 3.

It is assumed, in the following discussion, that the duty ratio of the operation of the battery simultaneous discharge circuit and the battery simultaneous discharge method in the first embodiment of the present invention is 1:2.

A Period of time starting from Period A to Period D shown in FIG. 2 represents a cycle period of the DC/DC converter 3, while a period of time from period A to period C is a control timing period of the switching element 1 and the switching element 2. The period lengths are even.

Referring to FIG. 1, the battery controller 6 checks (periodically detects) the capacities of the battery 4 and the battery 5 and calculates the capacity ratio between the battery 4 and the battery 5. Based on the calculated capacity ratio, the controller calculates a duty ratio and generates a duty ratio control signal indicating the duty ratio. The generated duty ratio control signal is output to the DC/DC converter 3. Then, the DC/DC converter 3 sets the duty ratio based on the received duty ratio control signal to control the switching element 1 and the switching element 2 according to the duty ratio. To control the switching element 1 and the switching element 2 is to control the ON/OFF states of the switching element 1 and the switching element 2.

Next, the control timing of the switching element 1 and the switching element 2 will be described with reference to FIG. 2.

The DC/DC converter 3 enables the switching element 1 during period A and remains ON while the corresponding battery is used for the power source. The switching element 1 is disabled during periods B and C and is enabled again by the DC/DC converter 3 during Period D. The disabled state, which refers to the state in which the switching element 1 is not enabled by the DC/DC converter 3, is usually the OFF state.

On the other hand, the DC/DC converter 3 during period A disables the switching element 2, unlike the switching element 1. The DC/DC converter 3 enables it during Periods B and C and maintains ON while the corresponding battery is used for the power source. The switching element 2 is disabled again during period D.

As described above, the switching element 1 and the switching element 2 repeat the operation, from period A to period D, under control of the DC/DC converter 3.

If the battery 4 and the battery 5 are exhausted during operation and, as a result, the capacity ratio between the battery 4 and the battery 5 changes, the battery controller 6 immediately calculates the remaining capacity ratio from the remaining capacities of the battery 4 and the battery 5. The battery controller calculates a new duty ratio based on the ratio of the remaining capacities and sends the new duty ratio to the DC/DC converter 3. In this way, the old duty ratio set in the DC/DC converter 3 is replaced (updated) by the new duty ratio.

Figure 3:
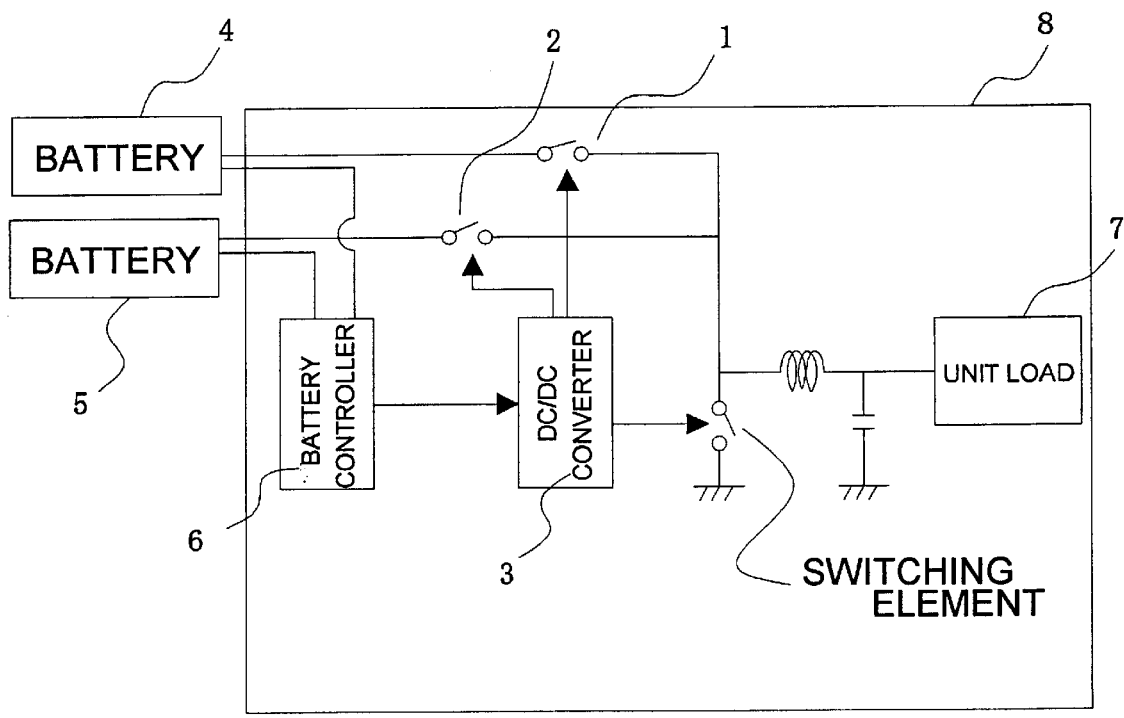
FIG. 3 is a diagram showing the configuration of another embodiment of the first embodiment of the discharge circuit according to the Present invention.
Figure 4:
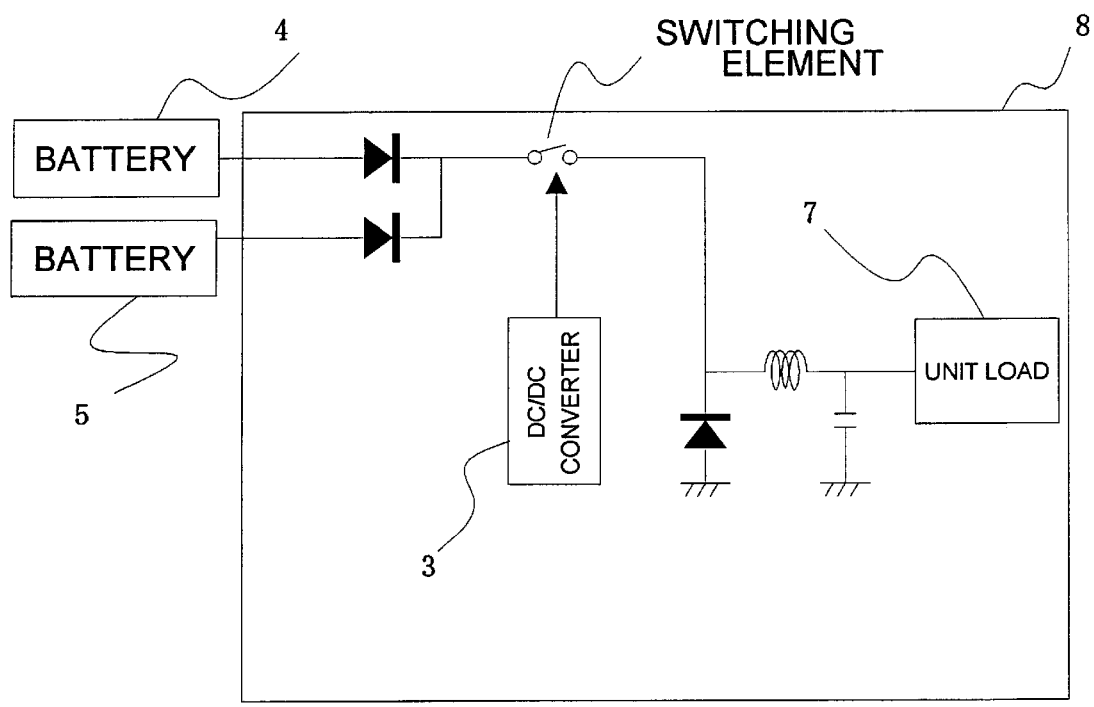
FIG. 4 is a diagram showing the configuration of a conventional discharge circuit.

The DC/DC converter 3 may be of a synchronous rectifier type converter shown in FIG. 3, a step-up converter (not shown), or a linear regulator (not shown).

Although the battery 4 and the battery 5, i. e., two batteries are used for the battery simultaneous discharge circuit in this embodiment, three or more batteries may also be used. When three or more batteries are used, a switching element is connected to each battery. The duty ratio, which is set in the DC/DC converter 3 for controlling each of these switching elements, is determined by the ratio of battery capacities of those three or more batteries. The capacity ratio may also be used as the duty ratio.

The meritorious effects of the present invention are summarized as follows.

The discharge circuit and the duty ratio setting method according to the Present invention can perform simultaneous discharge regardless of the battery voltages, allowing a plurality of batteries to be exhausted at the same time.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items might fall under the modifications aforementioned.

What is claimed is:

1. A discharge circuit comprising at least two batteries, a plurality of switching elements connected to said batteries, and a DC/DC converter controlling ON/OFF states of said plurality of switching elements, wherein a duty ratio setting unit is connected to said DC/DC converter, said duty ratio setting unit checking capacities of said batteries, calculating a duty ratio based on a battery capacity ratio calculated from the capacities of said batteries to determine a switching timing in which said plurality of switching elements are to be switched, and setting the duty ratio in said DC/DC converter.

2. The discharge circuit as defined by claim 1, wherein said duty ratio setting unit checks remaining capacities of said batteries, calculates a new duty ratio based on the battery capacity ratio calculated from the remaining capacities, and updates the duty ratio set in said DC/DC converter.

3. A duty ratio setting method comprising the steps of:

checking capacities of at least two batteries;

calculating a battery capacity ratio from the battery capacities and, based on the battery capacity ratio, calculating a duty ratio which determines a switching timing in which a plurality of switching elements connected to said batteries are to be switched; and transmitting the duty ratio to a DC/DC converter as a signal to set the duty ratio in a DC/DC converter.

4. The duty ratio setting method as defined by claim 3, further comprising the steps of:

checking remaining capacities of said batteries when the battery capacity ratio varies caused by discharge of the batteries;

calculating a remaining capacity ratio between said batteries based on the remaining capacities of said batteries to calculate a new duty ratio from the remaining capacity ratio of the batteries; and transmitting the calculated new duty ratio to the DC/DC converter as a signal to change the duty ratio that is set in the DC/DC converter.

5. A computer readable program product which sets a duty ratio, said program causing a processor to execute the steps of:

checking capacities of at least two batteries;

calculating a duty ratio which determines a switching timing in which a plurality of switching elements connected to said batteries are to be switched; and transmitting the duty ratio to a DC/DC converter as a signal to set the duty ratio in the DC/DC converter.

6. The program product as defined in claim 5 further comprising the steps of:

checking remaining capacities of said batteries when the battery capacity ratio varies caused by discharging of the batteries; and calculatin a remaining capacity ratio between said batteries based on the remaining capacities of said batteries to calculate a new duty ration from the remaining capacity ration of the batteries.

7. A medium carrying thereon said program as defined by claim 5.

* * * * *